US010069801B1

United States Patent
Singhal (10) Patent No.: US 10,069,801 B1
(45) Date of Patent: Sep. 4, 2018

(54) SYSTEMS AND METHODS FOR COMPUTER NETWORK DEFENSE

(76) Inventor: Tara Chand Singhal, Torrance, CA (US)

( * ) Notice: Subject to any disclaimer, the term of this patent is extended or adjusted under 35 U.S.C. 154(b) by 2344 days.

(21) Appl. No.: 11/880,347

(22) Filed: Jul. 20, 2007

Related U.S. Application Data

(60) Provisional application No. 60/832,846, filed on Jul. 23, 2006.

(51) Int. Cl.
H04L 29/06 (2006.01)

(52) U.S. Cl.
CPC ............................ H04L 63/0428 (2013.01)

(58) Field of Classification Search
CPC ............................................ G06F 9/468
USPC ........................................... 726/12–13
See application file for complete search history.

(56) References Cited

U.S. PATENT DOCUMENTS

| 6,266,413 | B1* | 7/2001 | Shefi | 380/46 |
| 7,065,643 | B1* | 6/2006 | Cornils et al. | 713/163 |
| 2003/0014706 | A1* | 1/2003 | Poeluev | 714/752 |
| 2003/0204728 | A1* | 10/2003 | Irwin | 713/176 |
| 2004/0225885 | A1* | 11/2004 | Grohoski et al. | 713/189 |

* cited by examiner

Primary Examiner — Simon P Kanaan
(74) Attorney, Agent, or Firm — Steve Roedan, Esq.

(57) ABSTRACT

Systems and methods of computer network defense using Checksum-Security System (CSS) 10. An embodiment called Header Checksum Security System (HCSS) 22 uses header block checksum of a packet, and may be used in all routers or a subset of routers of a network. Another embodiment called Data Checksum Security System (DCSS) 24 used data block checksum pf a packet and may be used in the host computers. CSS uses randomization of the existing artifacts of a data packet, that of checksums of the packet. The randomization is able to substitute one value of the artifact with another identical value of the artifact, that is, one checksum is replaced by another checksum, where the replaced checksums have no relationship to the original checksums, they having been derived from a randomization process of the original checksum.

20 Claims, 8 Drawing Sheets

CSS 20 exchange mechanism 23

IP Sec protocol 23A

RIP/BGP control packets 23B

Out of band/Manual 23C

TCP/IP Data 23D

Figure 5B

CSS 20 data exchange contents 21

Source: IP address: 44

Header Checksum list 32

Data checksum list 32

Encoding logic reference 35

Encoding logic input 50

Enable/Disable HCSS 36

Enable/Disable DCSS 38

Figure 5A

| | |
|---|---|
| Using a data packet's checksum(s) for separating a trusted class of packets from other packets in a computer network. | 72 |
| Creating a random list of checksums as a subset of all possible checksums and optionally creating a secret. | 74 |
| Distributing the list and the secret among the routers of the network. | 76 |
| Distributing the list and the secret among the sending and receiving nodes. | 77 |
| Selecting randomly a checksum from the list as a security-checksum for the header checksum of a data packet to be sent or routed and optionally applying the secret to this checksum. | 78 |
| Selecting randomly a checksum from the list as a security-checksum for the data of a data packet to be sent or routed and optionally applying the secret to this checksum. | 80 |
| Replacing a computed original checksum for the header part of a data packet in a sending computer node or router with a security-checksum by adding a data pad to compute to this security-checksum. | 82 |
| Replacing a computed original checksum for the data part of a data packet in a sending computer node or router with a security-checksum by adding a data pad to compute to this security-checksum. | 84 |
| Verifying the packet's header and data security-checksums, at a receiving computing node or a router, is from the list, as a means to trust the data packet is from a trusted source router or host. | 86 |
| Updating periodically the checksum lists and the secret including the encoding logic and/or the logic input may be refreshed with new data. The DCSS and HCSS may also be enabled and disabled. | 88 |

SYSTEMS AND METHODS FOR COMPUTER NETWORK DEFENSE

CROSS REFERENCE TO RELATED APPLICATIONS

This application claims priority on Provisional Application Ser. No. U.S. 60/832,846, titled "Systems and Methods of Computer Network Defense" filed on Jul. 23, 2006, by Tara Chand Singhal. The contents of the Provisional Application Serial No. 60/832,846 are incorporated herein by reference.

FIELD OF THE INVENTION

The present invention is directed to systems and methods for computer network defense that quickly and efficiently separate trusted data packets in the network from un-trusted data packets from being processed or routed in the network.

BACKGROUND

The structure of an Internet Protocol data packet has a header block and a data block. The header block has a source IP address, a destination IP address, and other fields. The source and destination IP addresses are entirely made up by a sender, and hence there is no assurance to the receiver of a data packet that these are genuine. This has been the basis for many types of security weakness as have been well described in the trade literature and news items.

To provide security of the data packet, the data part is encrypted by the sending computer and decrypted by the receiving computer. As means of security, filters have also been used to filter the contents of data packets based on signatures representing known anomalies, such as a virus, worm etc. Such filters are used in the host and may be used in gateway routers as well.

Defensive techniques of packet flow traffic analysis are used to discern anomalous rate of packet flow by comparing them with the normal traffic flow patterns. These techniques have been given the names of Intrusion Detection and Prevention Systems (IDS/IPS) by the information security industry.

In spite of these defenses, based on published news items, unknown or harm-causing packets may still be introduced in the network. If there is no prior signature for a known anomaly, then it is not possible to filter data packets. Hence the harm intentioned packets are indistinguishable from other packets and cannot be separated based on the content of the packet, either in the header or the data. The IDS and filter are cumbersome and many times ineffective techniques of computer network defense and more effective and sophisticated systems and methods of computer network defense are required.

It is an objective of this invention to provide more effective and sophisticated systems and methods of computer network defense.

SUMMARY

This invention discloses systems and methods of computer network defense that quickly and efficiently separate packets originating from trusted source networks from those that are originating from un-trusted or unknown networks at an in-route router, border routers and the hosts in a network. These systems and methods are based upon creating hidden or transparent markers in the checksums(s) of packets themselves. The systems and methods are collectively called Checksum Security Systems (CSS).

CSS uses a unique randomization of the existing artifacts of a data packet. These artifacts of a data packet are the header checksum and data checksums of the packet. The unique randomization is able to substitute one value of the artifact with another identical value of the artifact, that is, one checksum is replaced by another checksum, where the replaced checksums have no relationship to the original checksums, they having been derived from the randomization process.

The CSS is a hidden and a transient security mechanism so that observers may not be able to discern when the CSS is active or how it may be working. The CSS may be used selectively in routers and hosts and may be enabled selectively in time. Further CSS may be used to provide routing protocol defense security mechanisms as well as host-to-host defense security mechanisms.

These systems and methods of security for computer network defense enable the router and hosts to be able to quickly differentiate by the examination of only the checksum(s) between packets originating from known or trusted network and packets originating from unknown network and thus be able to provide computer network defense of this invention.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts. The drawings are:

FIG. 6 is a flow diagram that illustrates methods of checksum security function of this invention.

DESCRIPTION

Figure 1A:
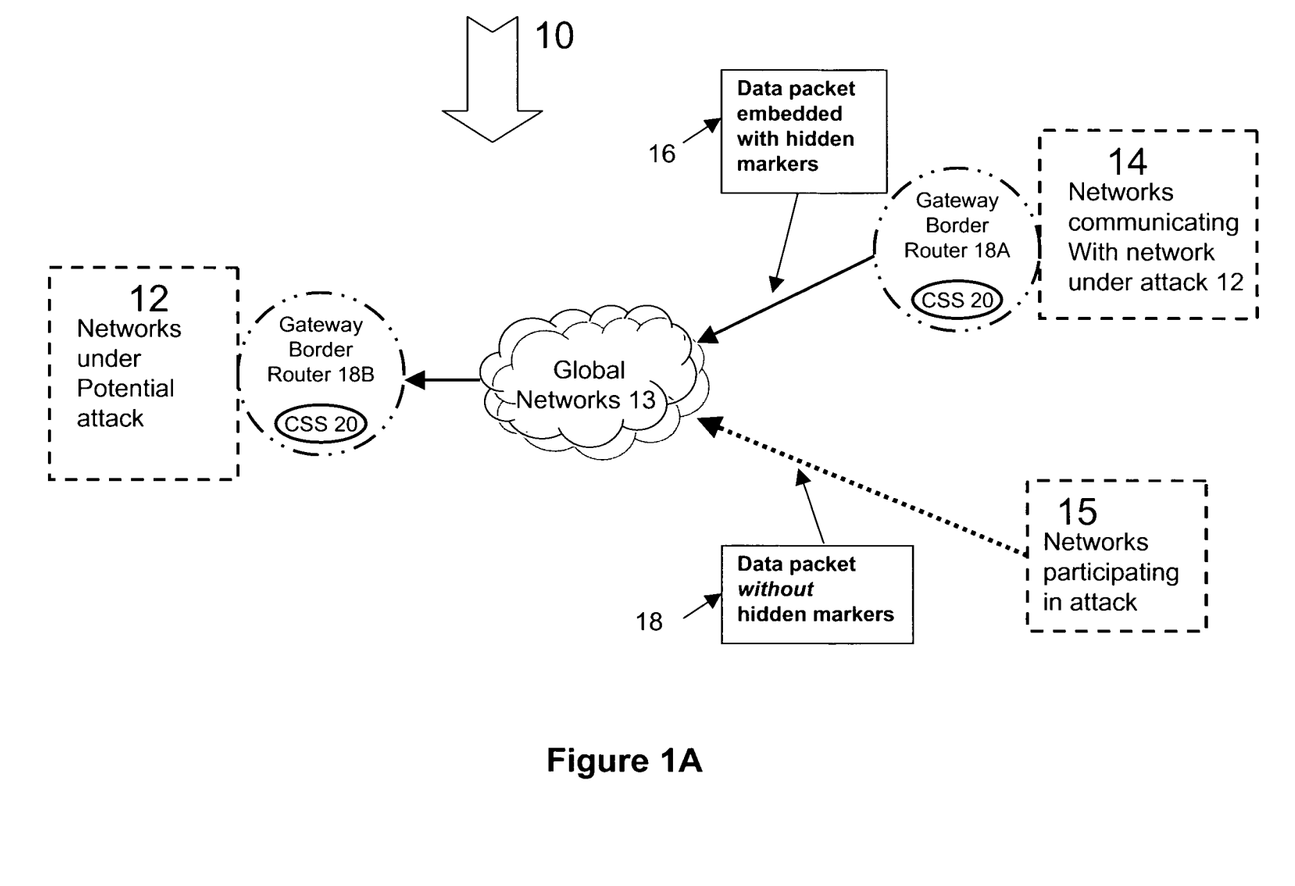
FIG. 1A-B are block diagrams that shows a version of computer network defense system of this invention.

With reference to FIG. 1A, the CSS system 10 is able to separate packets 16, embedded with hidden markers arriving at the network under attack 12, originating from trusted networks 14 via gateway router 18A, from those data packets 18, without such hidden markers, that are from unknown networks 15, that may be participating in an attack on network 12 via a global network 13. Since an attack of an unknown type and magnitude may happen at unknown times, the CSS may be activated when the attack is detected or the CSS may be operative at all times. CSS is implemented in the system 10 by means of CSS logic 20 that is present, in one embodiment, in the border gateway routers 18A and 18B of the networks 14 and 12 respectively.

Figure 1B:
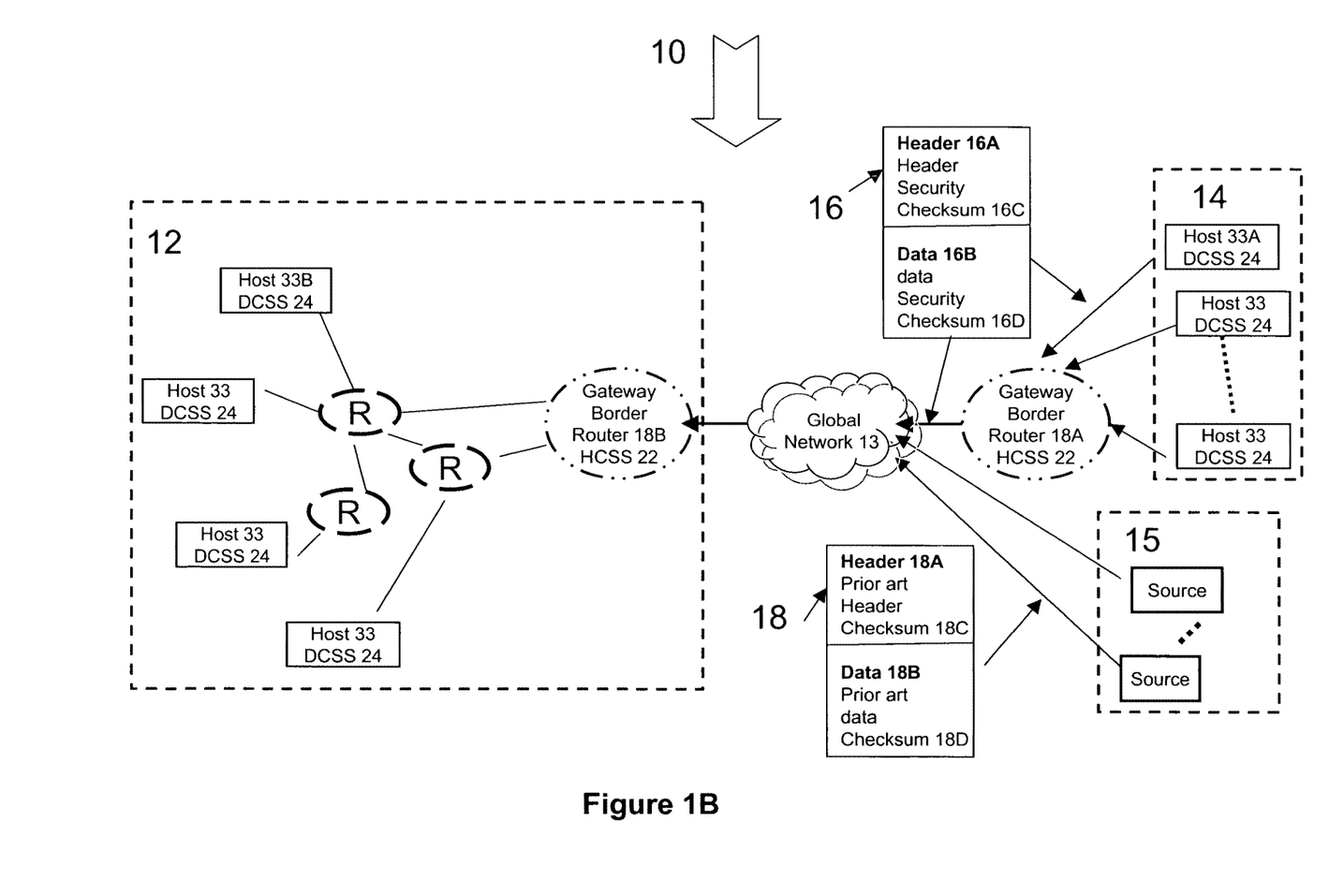

With reference to FIG. 1B, what is shown is a simplified illustration of computer network defense system 10 of this invention. The system 10 has a business network 14, a border gateway router 18A that enables the business network 14 to connect with a global network 13. A business network 12, that has a border gateway router 18B that enables the network 12 to connect to the global network 13 and be able to communicate with network 14. Also shown are other global network connection sources 15 from unknown servers.

The data packets that travel from the unknown source network 15 have format of prior art data packet 18, having a header 18A, header checksum 18C, data 18B and data checksum 18D.

The data packet 16 that originates from a host 33A within the network 14 and is sent from the router 18A to global network 13 has prior art format of header 16A and data 16B. The data packet 16 may have a header security checksum 16C and may have a data security checksum 16D of this invention.

As shown in FIG. 1B, the Checksum Security System (CSS) 10 has two main embodiments, called Header Checksum Security System (HCSS) 22, which may be used in all routers or a subset of routers of a network and Data Checksum Security System (DCSS) 24, which may be used in the host computers.

Figure 2A:
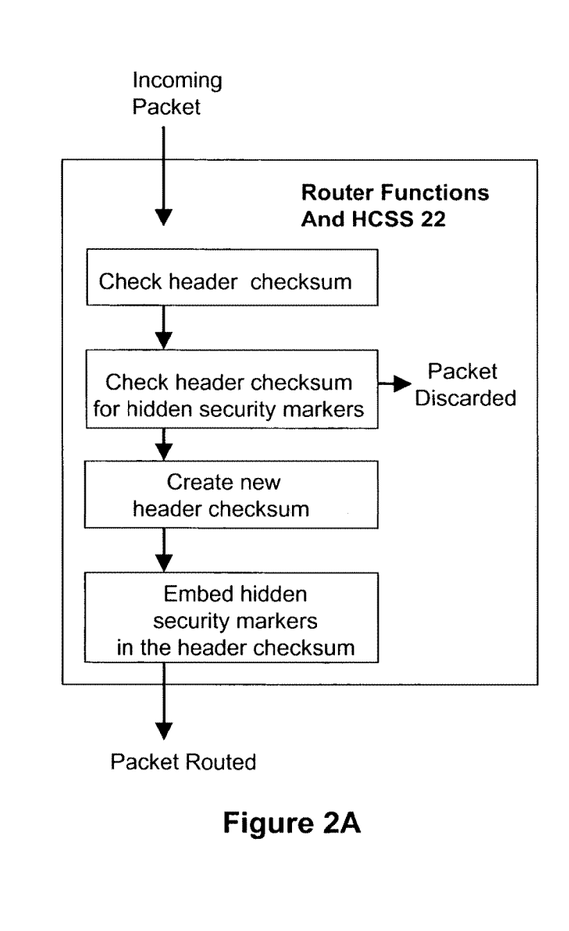
FIG. 2A is a block diagram that illustrates the operation of a Header checksum security function of this invention.

With reference to FIG. 2A, in the HCSS 22 embodiment, router functions receive an incoming packet, check the header checksum for physical data corruption as in prior art and then check the header checksum for hidden security markers to decide if it belongs to a trusted class of packets and should be routed or discarded if the hidden marker verification fails according to this invention. For routed packets a new header checksum is created as in prior art, as the router has the ability to alter the header fields. Then another hidden security marker is embedded in the packet that is routed out of the router, as in this invention.

Figure 2B:
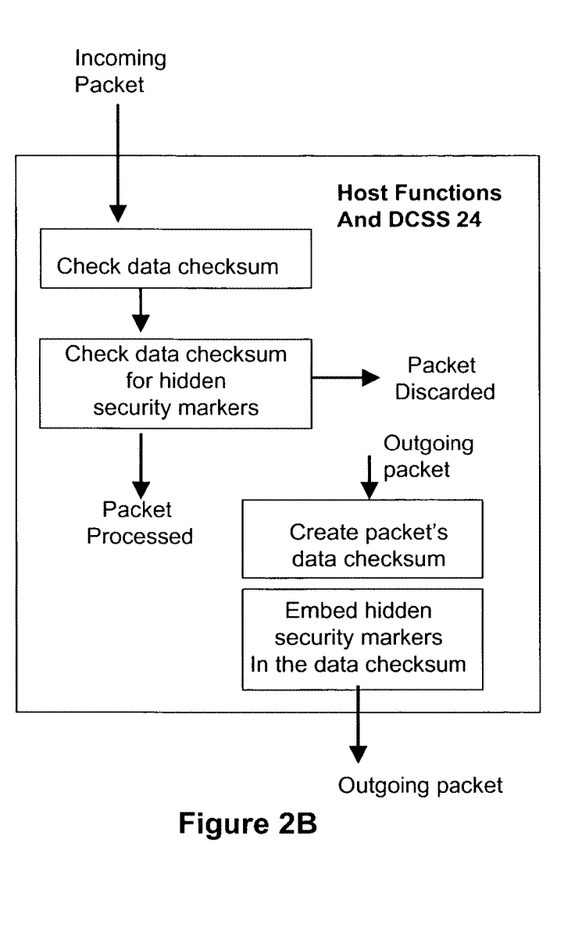
FIG. 2B is a block diagram that illustrates the operation of a Data checksum security function of this invention.

With reference to FIG. 2B, in the DCSS 24 embodiment, host functions receive an incoming packet, check the data checksum of a packet for physical data corruption as in prior art and then check the data checksum for hidden security markers to decide if it belongs to a trusted class of packets and should be processed or discarded. If the hidden marker verification fails according to this invention, the packet is discarded or may be saved for analysis. For outgoing packets, a data checksum is created, as in prior art and then a hidden security marker is embedded in the data checksum in an outgoing packet.

With reference to FIGS. 1A-B and 2A-B, the systems and methods of security for computer network defense, enable the router 18B and Hosts 33B to be able to quickly differentiate by the examination of only the checksum(s), the difference between packets 16 originating from network 14 and packets 18 originating from unknown network 15 and thus be able to provide computer network defense of this system 10.

Figure 7:
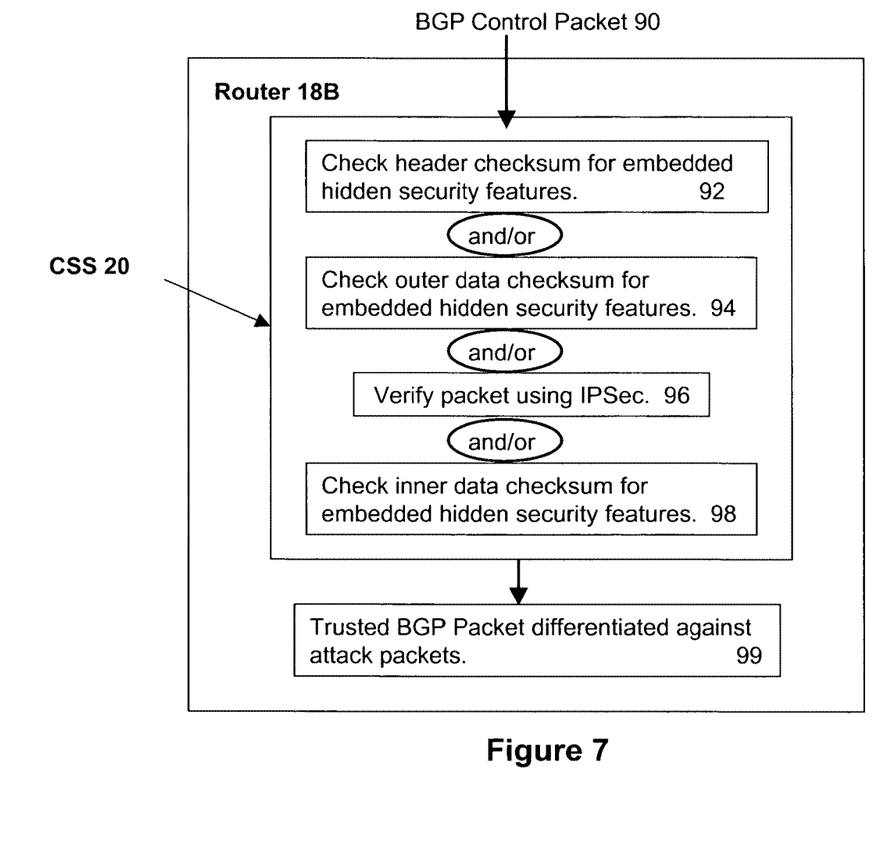
FIG. 7 is a flow diagram that illustrates use of CSS for BGP protocol security of this invention.

The systems and methods of security for computer network defense are further described with reference to FIGS. 3 to 6. FIG. 7 describes application of CSS as a layer of security for the control packets of a routing protocol such as BGP. Headings are provided for the convenience of the reader.

Security Checksum 30

This invention discloses security-checksums. In general, checksums are widely used in the prior art including for applications such as, an Internet Protocol data packet. In the IP packet a checksum is used in the header block of the packet to verify that the contents of the packet header have not been corrupted during the physical transmission process. In the IP packet a checksum is used in the data block of the packet to verify to the packet recipient's host that the contents of the data have not been corrupted during the physical transmission process.

The checksums are usually 32 bits in length and represent a bit summation of the 32 bit words of a data block and occupy the entire space in a 32-bit word. However they may longer or shorter such as 16 bits, 48 bits or 64 bits and are usually the same as the length of a word in bits.

Figure 3:
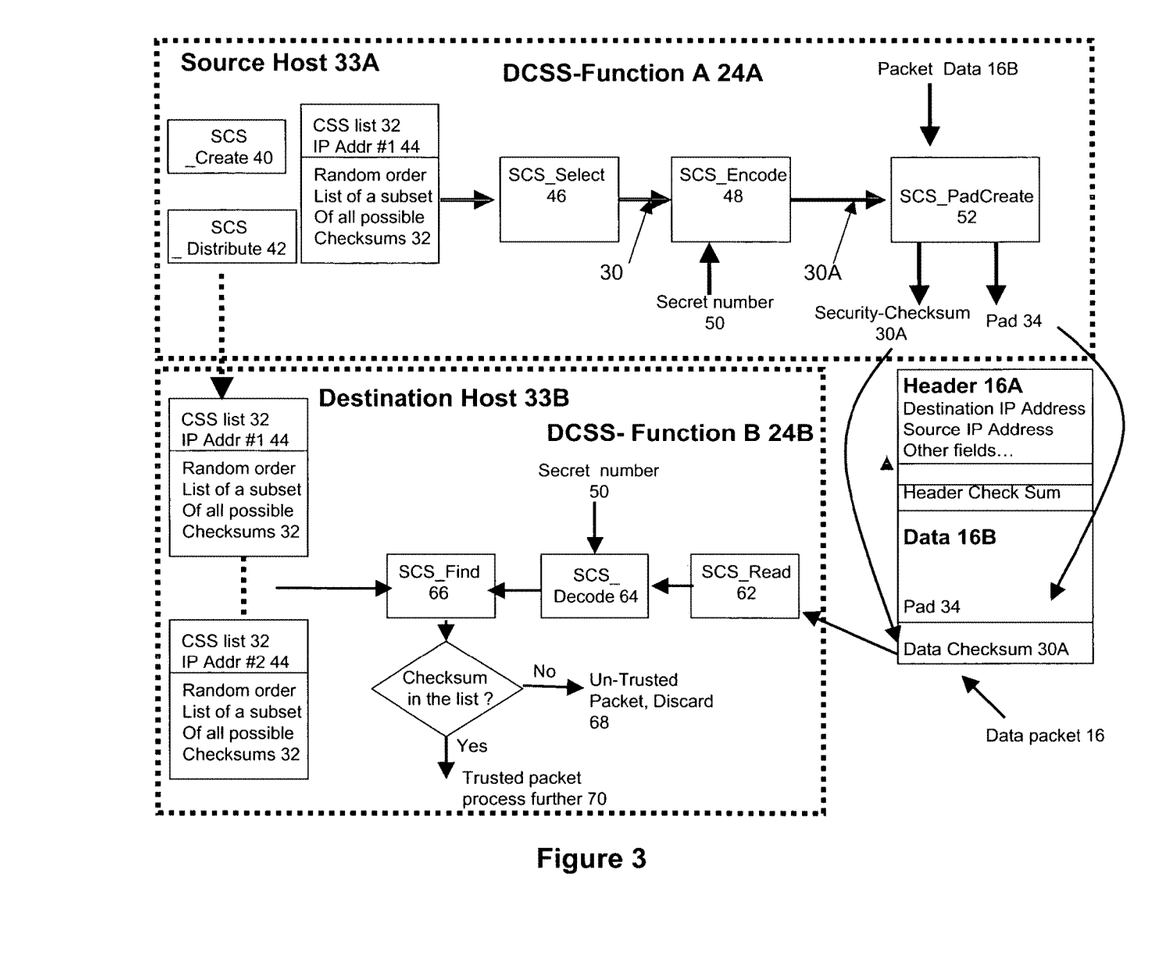
FIG. 3 is a block diagram that illustrates the functions of a Data checksum security function of this invention.
Figure 4:
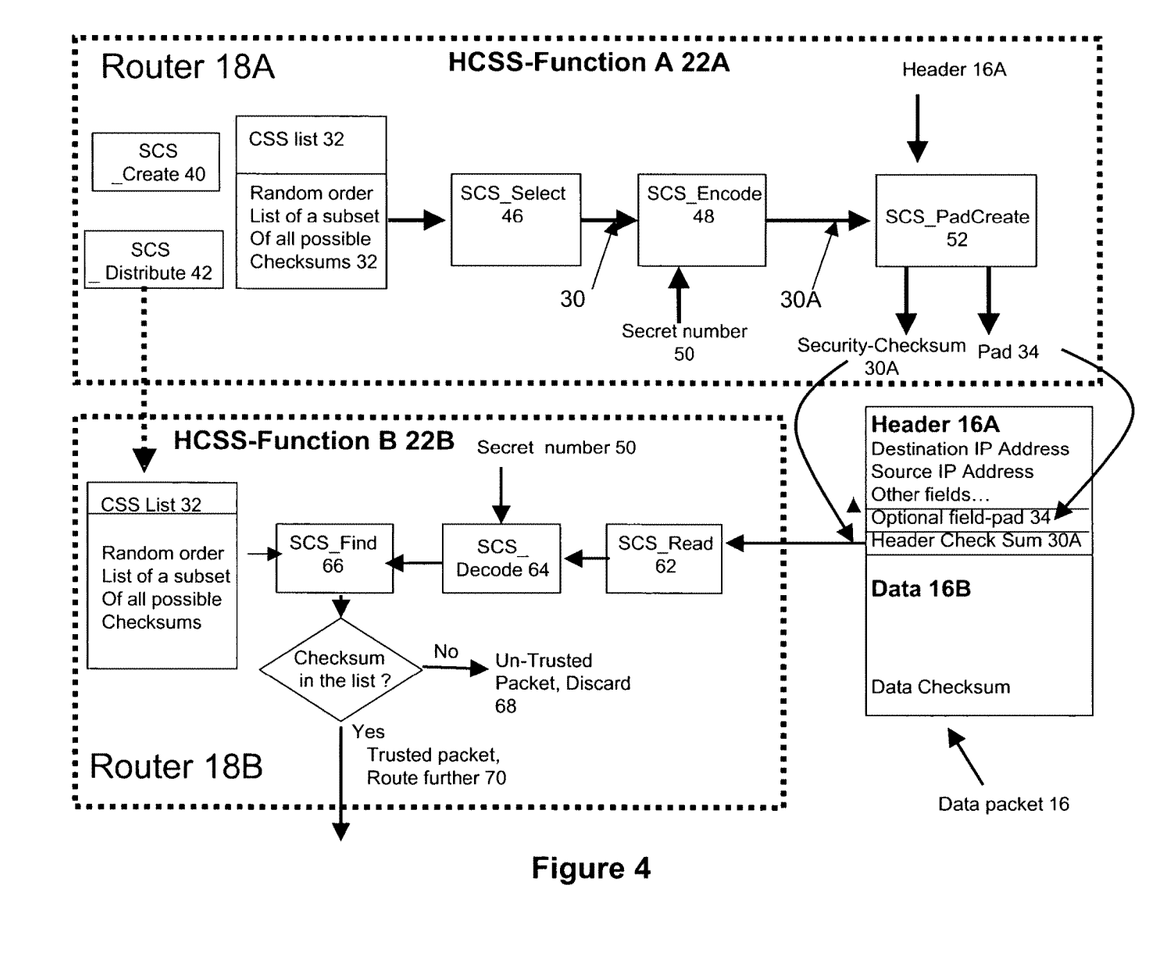
FIG. 4 is a block diagram that illustrates the functions of a Header checksum security function of this invention.

With initial reference to FIGS. 3 and 4, a security-checksum 30 of this invention is used for computer network defense. The security-checksum 30 is selected randomly from a random list of a subset of all possible checksums. As an illustration, the list may vary in size and may be short in length and may contain even 10 or 100 or 1000 or more possible checksums. The probability of a checksum being a security checksum from all possible checksums is very low. If there are 100 checksums in the list, then a probability of having a checksum from this list is 100 divided by 4,294,967,296 is equal to 0.0000023%, where the number of possible checksums may be 2 to the power 32=4,294,967,296, a very large number. Hence, when a checksum is checked as a security checksum, if the check is a success, then the packet is a trusted data packet.

The security checksum 30 may optionally be encoded by an encoding scheme, where the encoded security checksum 30A that is used as a security checksum itself is not from the checksum list. This makes it impossible to know what security checksum is used given the possibility of the checksum being any one from a space of 4,294,967,296 possible checksums. Then, even if the checksum list is compromised, the actual checksums that are used are not discernible as they are randomly different for each packet.

Further, only the encoding may be used on the original checksum, enabling the checksum substitution from the checksum list and checksum encoding by a secret to be used independent of each other. If the original checksum is only encoded, then the checksum lists are not used.

A checksum selected from this list and used in place of prior art original checksum and an original checksum or a checksum from the list that in encoded by the secret is called a security-checksum. To be able to use a security-checksum and it still be able to function as a checksum, a data pad is created that is added to the header data or the packet data so that the original data and the data pad in combination computes to the security-checksum. The data pad may simply be a 32-bit word that provides those bits that add up to the security-checksum.

Data Checksum Security System (DCSS) 24

With reference to FIG. 3, DCSS has a DCSS-function A 24A in source host 33A. It replaces a computed original checksum for the data part of the packet in a sending computer node with a security-checksum 30 obtained from a pre-arranged list of checksums 32 by adding a data pad 34 to the data part that computes to the security-checksum 30. The DCSS-function A 24A may also include following sub-functions:

SCS_Create function 40 creates a list of checksums 32 as a randomly selected subset of all possible checksums.

SCS_Distribute function 42 distributes the list 32 between the sending and receiving nodes such as hosts 33A and 33B.

Additionally, hosts 33 may maintain multiple checksum lists 32, where each list is referenced by an identification of a computer host, such as its IP address 44. This enables the sending host to use a specific list 32 that corresponds to the receiving node identification by the IP address, assuring the receiving host to be able to identify packets as being from a specific trusted sending computer host.

SCS_Select function 46, randomly selects a checksum from the list 32 as the security-checksum 30 for a data packet to be sent from the sending host 33A.

Optional function SCS_Encode function 48 in the sending host, optionally encodes the security checksum 30 before using it as the security-checksum 30A in the data packet by use of an encoding logic that inputs a secret number 50.

SCS_PadCreate function 52 uses the security checksum 30 or 30A and the packet data 16B, to create a data pad 34 that is to be placed at the end of data. Data pad 34 would enable the data checksum of the packet to equate to the security checksum 30 or encoded security-checksum 30A.

A DCSS-function B 24B, in destination host 33B, verifies the packet's security-checksum 30 or 30A at a receiving computing host 33B is from the pre-arranged list 32. This provides a means to trust the data packet originated from the sending computing host 33A in network 14 and to be able to differentiate such a trusted class of packets 16 from an un-trusted class of packets 18 that may originate from unknown network 15, as shown in FIG. 1A-B.

The DCSS-function B 24B may include the sub-functions:

SCS_Read function 62 reads the data checksum 30 or 30A from the packet 16 to perform the prior art checking of checksum for data corruption during the physical transmission process and if DCSS is implemented, decodes the security checksum 30A using SCS_Decode function 64.

SCS_Decode function 64 decodes the security-checksum 30A, in the receiving host 33B if it was encoded via function 48 in source host 33A, using the same secret number 50 as used by the SCS-Encode function 48.

The encoding and decoding logic in functions 48 and 64 may use any number of methods. The encoding and decoding logic may use a secret number 50 as an input, wherein; the secret number is established between the sender and receiver. The secret number 50 may be input to the DCSS at the time of initiating the connection between the sender and the receiver. The encoding and decoding functions hide the security-checksum 30A that is actually used from the security-checksum 30 that is obtained from the list of checksums 32 itself, so that if a malicious code and or hacker has access to the hosts, they have access to only the list 32 and not the security-checksum 30A that is actually used, as it is derived from the encoding logic 48 and recovered with the help of the decoding logic 64.

As a simplified illustration, if the secret 50 is a number such as 109 and encoding logic is from a list of logics that includes, adding the secret to the checksum, then the encoding that is performed adds the secret to the checksum. For decoding, the secret is reversed in the security-checksum to arrive at the original checksum. The data pad is then removed and the original checksum is recomputed and then these two checksums are compared to verify the correct secret existed in the security-checksum. There may be any number of encoding schemes and each may be identified by a reference. The entire secret made up of the secret 50 and the encoding scheme reference may be distributed among the hosts.

Figure 5A:
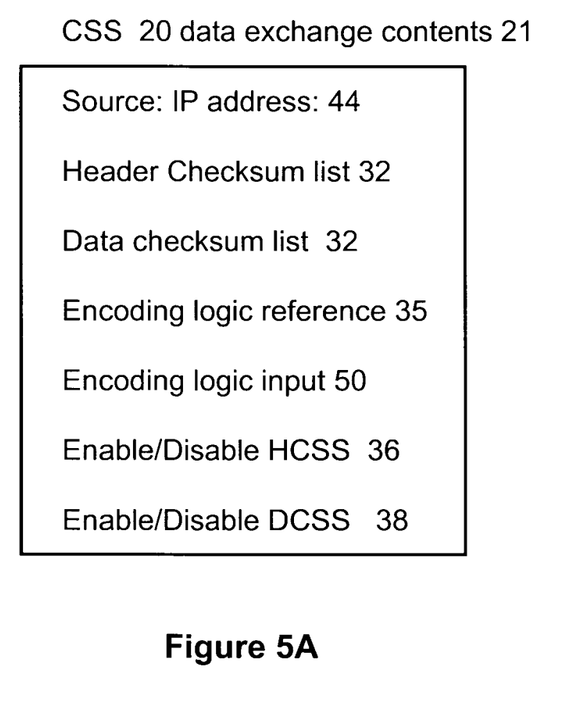
FIG. 5A is a block diagram that illustrates the parameters for a distribute function of this invention.

Periodically the secret 50 and the encoding scheme may be refreshed and changed by sending advisory packets to the hosts in the network. As illustrated in FIG. 5A, the CSS exchange contents may include source IP address 44, data checksum lists 32, encoding logic reference 35, encoding logic input 50, and enable/disable DCSS commands 38.

Figure 5B:
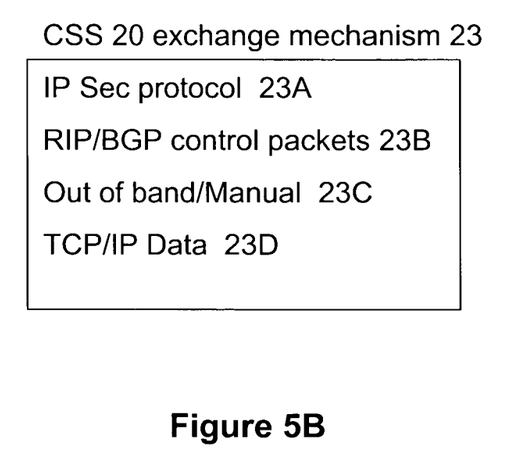
FIG. 5B is a block diagram that illustrates the prior method that may be used for distribute function of this invention.

SCS_Distribute function 42, described above may also be used to distribute the secret. As illustrated in FIG. 5B, for this distribution, any number of prior art exchange mechanisms 23 may be used, such as IP Security Association (SA) part of IPSEC protocol 23A, RIP/BGP control packets 23B, an out of band/manual method 23C, and a TCP/IP method 23D may be used.

SCS_Find function 66 finds the appropriate checksum list 32 for the source IP address 44 and then finds the security checksum 30 in that list. If able to find, the data packet is assumed being from a trusted source and is processed 70. If not, the data packet is assumed is from an un-trusted source and an alternate safety processing may be performed or the packet may simply may be discarded 68.

Where a data packet is encrypted, by a host or sending computer, there may be two data checksums, one called the inner checksum before the encryption and the other called the outer checksum, that is used after the encryption. DCSS-function may be applicable to either or both of these data checksums. However, the outer checksum may be preferred as the security-checksum may then be verified before decrypting the packet.

Header Checksum Security System (HCSS) 22

With reference to FIG. 4, HCSS has a HCSS-function A 22A, which replaces a computed original checksum for the header block of the packet in a sending router 18A with a security-checksum 30 obtained from a pre-arranged list of checksums 32 by adding a data pad 34 to the optional data fields of the header, such that the header block computes to the security-checksum 30. The HCSS-function A 22A has similar set of sub-functions as that have been described for DCSS-Function A 24A.

A HCSS-function B 22B verifies the packet's security-checksum 30 at an in-route router 18B is from the pre-arranged list 32 as a means to trust the data packet and to be able to differentiate a trusted class of packets from an un-trusted class of packets. The HCSS-function B 22B has similar set of functions as those that have been described for DCSS-Function B 24B.

As described for DCSS 24, periodically the secret 50 and the encoding scheme may be altered, by sending advisory packets to the other routers of the network. As illustrated in FIG. 5A, the CSS exchange contents 21 may include source IP address 44, header checksum lists 32, encoding logic reference 35, encoding logic input 50, and enable/disable HCSS commands 36. As illustrated in FIG. 5B, for this distribution, any number of prior art exchange mechanisms 23 may be used, such as IP Security Association (SA) part of IPSEC protocol 23A, RIP/BGP control packets 23B, an out of band/manual method 23C, and a TCP/IP method 23D may be used.

An in-route router may alter the header by changing a field such as TTL and re-computes the header checksum after such a change. Hence, a HCSS may need to be implemented in every such router that alters the header and thus the header checksum.

Operation of CSS 10

With reference to FIG. 6, methods of security in a computer-network may have the following steps. These steps may include further steps and all the steps may not be used and may not be used in the order identified herein.

At step 72, using a data packet's checksum(s) as a means of separating a trusted class of packets from other packets in a computer network. A packet has two checksums, one a header checksum that is used by the routers in a network and the other is a data checksum that is used by the application hosts in a network. In this invention either one or both of these checksums may be used to separate a trusted class of packets from an unknown or un-trusted class of packets.

At step 74 creating the list of checksums as a subset of all possible checksums and arranges the subset of checksums in a random manner and optionally creating a secret that is appropriate to an encoding logic that may be used.

A node may maintain multiple checksum lists, each list referenced by identification of a computer node. The sending node using a specific list corresponding to the node to which the data packets are sent to, thereby making checksums from a list that is unique to a sending and receiving node, enabling the receiving node to identify packets as being from a specific trusted sending computer node.

At step 76, distributing the list and the secret among the routers of the network.

At step 77, distributing the list and the secret between the sending and receiving nodes.

At step 78, selecting randomly a checksum from the list as a security-checksum for the header checksum of a data packet to be sent or routed and optionally applying the secret to this checksum.

At step 80, selecting randomly a checksum from the list as a security-checksum for the data of a data packet to be sent or routed and optionally applying the secret to this checksum.

At step 82, replacing a computed original checksum for the header part of a data packet in a sending computer node or router with a security-checksum by adding a data pad to compute to this security-checksum.

At step 84 replacing a computed original checksum for the data block of a data packet in a sending computer node, with a security-checksum obtained from a pre-arranged list of checksums by adding a data pad to the data that computes to this security-checksum.

At step 86, verifying that the packet's security-checksum, at a receiving computing node, is from the list, as a means to trust the data packet is from the sending computing node. Also verifies the packet's security checksum, at an in-route router is from the list, as a means to trust the data packet is a trusted packet or originated from a trusted part of the network.

At step 88, periodically the checksum lists and the secret including the encoding logic and or the logic input may be refreshed with new data. The DCSS and HCSS may also be enabled and disabled.

An enhanced security of routing protocol such as BGP routing protocol that makes BGP inter-router communication reliable in the event of deliberate malicious cyber attack on the routing infrastructure may be based on using hidden security markers in the checksum artifacts of this invention in the BGP control data packets.

These hidden security markers are transparent and may be used to quickly separate and filter genuine packets from the malicious packets. These non-encryption hidden marker techniques, as an independent scheme, work in parallel and are transparent to other security mechanisms such as IP Sec that may be used to encrypt the routing control traffic itself. Being non-encryption based, they are fast in their defensive mechanisms and thus provide a layered security for BGP.

FIG. 7 illustrates the CSS 20 as adapted for BGP security, where a BGP packet may be checked for trust and be differentiated against attack packets by checking the header checksum for hidden security markers, then checking the data checksum against hidden security markers, and then use of IP sec, if used. These may be used in any order, but the order described here is preferred as the checksum markers are very quick and efficient while being sophisticated in their operation.

For a BGP control packet 90, the CSS 20 at step 92 would check the header checksum for hidden markers. At step 94, would check outer data checksum for hidden markers. At step 96 may use IPSec and after decryption, at step 98 may check for hidden markers in the inner data checksum. These steps may be used in any number of ways, as all together or singly or in any combination. The output of CSS 20 would be a trusted BGP control packet 99 that had been differentiated against denial of service or other harm intentioned packets.

The CSS 10 systems and methods of this invention as described above may be employed in a number of ways for computer network defense. The CSS 20 using DCSS 24 may be used only in the host computers. The CSS using HCSS 22 may be used in the gateway routers of networks, or it may be used between routers of autonomous networks, or it may be used in all routers of a network, or it may be used in a subset of routers of a network. The network may be global computer network, it may be a subset of the global computer network, or it may be private network within a large business, or a private or a government agency.

The CSS logic 20 and the related data such as the CSS exchange contents 21 (FIG. 5A) need to be present where ever CSS is used. If the CSS is used in the hosts only, then CSS logic is present in the sending and receiving hosts only. If the CSS logic is used in the gateway routers, then it only need to be present in such Gateway routers. If the CSS logic is present in all routers or a large set of routers, then it needs to be present in all of them or the set of routers.

The CSS is transparent to those routers that do not implement the CSS, and only acted upon by those routers that do have the CSS implemented. Hence CSS may be implemented in strategic routers of a network that control the flow of packets to other networks and not all routers. The CSS may be implemented among those routers that are under the maintenance control of trusted business entities and not in those routers that are maintained by unknown or un-trusted business entities. Hence the implementation of CSS in a network is flexible and the scope of such implementation may be based on the specific security needs at one point in time or over a foreseeable period of time.

There are existing protocols that are used between routers and hosts to exchange and or distribute data sets and track the health of the individual nodes of a network. As shown in FIG. 5B, these protocols may also be used to distribute the pre-arranged checksum list to those routers that are part of the CSS network defense. These protocols may also be used to distribute the secret for encoding and decoding the security checksum, if so desired. Other protocols and methods may also be used.

When CSS 20 is implemented in the routers, by use of header checksum, HCSS 22 enables the routers to quickly and efficiently by comparing the header checksum to the stored list of checksums differentiates between packets, that should be routed and those that should be discarded or labeled as un-trusted packets for further analysis.

When CSS 20 is implemented in the hosts, by use of data checksum, DCSS 24 enables the hosts to quickly and efficiently by comparing the data checksum to the stored list of checksums differentiates between packets, that should be processed and those that should be discarded or labeled as un-trusted packets for further analysis.

Hence, the host and or routers that receive a packet with a security checksum, quickly and efficiently, by just the checksum can tell apart if the packet originated from a trusted source and should be routed or processed further or not.

Thus, at the time of a potential intrusion or denial of service attack or at other times, where it is not possible to determine if harm-intentioned packets are circulating in the network, the routers are able to separate, without cumbersome processing, by just examining the checksum whether these packets are part of the attack, or an intrusion, or are genuine packets from trusted senders. Thus CSS offers systems and methods of screening a trusted class of packets from un-trusted class of packets by merely using a packet's checksum by overlaying this extra security role on the prior art checksum, while not changing the original purpose and use of a checksum for detecting errors during transmission.

The CSS 20 may be used selectively or all the time based on the security needs of a network. For example, it may not be used and used only when an attack is detected. Alternatively it may be used all the time. Alternatively it may be used for special packets that are used for controlling the network of routers. Existing protocols and their control and command features may be used to enable and disable the implementation of CSS in the routers.

Hence, CSS 10 is a computer network defense system with a defense function that separates a trusted class of packets from other packets by use of a data packet's checksum and is able to prevent and ameliorate the effect of various types of network attacks and intrusions.

These embodiments of network defense and security, that of HCSS 22 and DCSS 24 in CSS 10, may be used together, in a network, even though they operate independently of each other. Hence a security system in a computer network could have a first means that uses a Data checksum-security function that uses a data packet's checksum as a means of providing security and a second means that uses header checksum in a security gateway router that substitutes original checksum of an individual data packet header with a randomly derived checksum for each packet, for hiding the substitution and enabling the In-route routers and destination host to be able to quickly separate trusted and un-trusted classes of packets in the network.

In summary, CSS system 10 and embodiments HCSS 22 and, DCSS 24, either used singly or in some combination make a novel use of the checksum of a packet to provide network defenses and network security. The benefits are that these are simpler scheme because they do not use encryption, hence less resources and use existing TCP/IP and other protocols such as Router Interface Protocol (RIP) and IPSec protocols. They provide better security by per packet ability to quickly separate secure packets by using the checksums in router and host. Further these techniques may be used selectively in a subset of a network and not in all routers or hosts of a network.

What is claimed is:

1. A computer network defense (CND) system, with a plurality of servers, with at least one server in communication with another server, over the global computer network, the CND system comprising:
   the plurality of servers, wherein each server has a CPU, a memory, and operating in the CPU and memory of the server an interface logic that exchanges data packets between the plurality of servers, wherein each of the data packet has a data checksum, and wherein the data checksum is used by the interface logic to verify that the data in the data packet has not been corrupted by noise during transmission between the plurality of servers;
   a trust logic stored in each server and operating therein, wherein, the trust logic verifies that the data packets received at a receiving server from a sending sever had originated indeed from the sending server;
   the trust logic has stored in the memory of the each server, pre-arranged lists of data elements, wherein the data elements are formatted as checksums for use in the data packets;
   the trust logic reformats each data packet being formatted in the sending server, being communicated to the receiving server, with a checksum that has been randomly selected from the pre-arranged lists;
   the receiving server, receives the data packets and the trust logic verifies the checksum in the data packet has a checksum that exists in the pre-arranged lists, thereby the trust logic creates a trust mechanism between the first and the second sever.

2. The CND system, as in claim 1, further comprising:
   the trust logic replaces the original checksum for the data part of the data packet in the sending server, with the security-checksum obtained from the pre-arranged list of checksums by adding a data pad to the data part that computes to the security-checksum; and
   the trust logic verifies that the data packet's security-checksum, at the receiving server, is from the pre-arranged checksum list, thereby the security-checksums are used to differentiate the trusted class of packets from an un-trusted class of packets.

3. The CND system, as in claim 1, further comprising:
   the trust logic creates the pre-arranged list of checksums as a randomly selected subset of all possible checksums.

4. The CND system, as in claim 1, further comprising:
   the trust logic in the sending server maintains multiple pre-arranged checksum lists, each list referenced by an identification of a server and enables the sending server using a checksum list corresponding to the receiving server identification, enabling the receiving server to identify packets as being from a trusted sending server.

5. The CND system, as in claim 1, further comprising:
   the trust logic in the sending server, selects the security-checksum from the pre-arranged list, encodes it using an encoding/decoding logic before using it as the security-checksum in the data packet checksum field and the trust logic decodes the security-checksum, in the receiving server, before verifying its presence in the pre-arranged list;
   the trust logic prearranges the encoding and decoding logic between the sending and the receiving servers.

6. The CND as in claim 5, further comprising:
   the encoding and decoding logic use a secret number as an input, the secret number is established between the sending and receiving servers and is input as a parameter at the time of a communication connection between the sending and receiving servers.

7. A computer network defense (CND) system, for a global computer network, the CND system comprising:
   the global computer network has a plurality of routers, wherein each router has a CPU, a memory, and operating in the CPU and memory of the router a routing logic that routes data packets between the plurality of the routers, wherein each of the data packet has a header with a header checksum, and wherein the header checksum is used by the routing logic to verify that the header in the data packet has not been corrupted by noise during transmission between the plurality of the routers;

a trust logic stored in the plurality of routers and operating therein, wherein, the trust logic verifies that the data packets received at a receiving router from a forwarding router had originated indeed from the forwarding router;

the trust logic has stored in the memory of the each router, pre-arranged lists of data elements, wherein the data elements are formatted as header checksums for use in the headers of the data packets;

the trust logic reformats the header of each data packet in the forwarding router, being communicated to the receiving router, with a header checksum that has been randomly selected from the pre-arranged lists;

the receiving router, receives the data packets and the trust logic verifies the header checksum in the data packet has a checksum that exists in the pre-arranged lists, thereby the trust logic creates a trust mechanism between the plurality of routers.

8. The CND system, as in claim 7, further comprising:
the trust logic arranges the presence of the list and the secret at the plurality of the routers by one of the methods from a group of, use of Security Association part of IPSEC protocol, by out of band method, TCP/IP, and by manual method.

9. The CND system, as in claim 7, comprising:
the trust logic replaces an original checksum for the header part of the data packet in a forwarding router, with a security-checksum obtained from a pre-arranged list of checksums by adding a data pad to the optional data fields of the header that computes to the security-checksum;
the trust logic verifies the packet's security-checksum, at an in-route router is from the list to differentiate a trusted class of packets from an un-trusted class of packets.

10. The CND system, as in claim 7, further comprising:
the trust logic creates the pre-arranged list of checksums as a randomly selected subset of all possible checksums.

11. The CND system, as in claim 7, further comprising:
in the forwarding router, the trust logic selecting the security-checksum from the pre-arranged list, and then encoding it using an encoding and decoding logic before using it as the security-checksum in the data packet header and decoding the security-checksum, in an in-route router, before verifying its presence in the list;
the encoding and decoding logic is prearranged between the routers by the trust logic.

12. The CND as in claim 11, further comprising:
the encoding and decoding logic uses a secret number as an input, wherein the secret number is pre-established between the plurality of the routers.

13. A method for a computer network defense (CND) system, with a plurality of servers, with at least one server in communication with another server, over the global computer network, the method comprising steps of:
configuring the plurality of servers, wherein each server has a CPU, a memory, and operating in the CPU and memory of the server an interface logic that exchanges data packets between the plurality of servers, wherein each of the data packet has a data checksum, and wherein the data checksum is used by the interface logic to verify that the data in the data packet has not been corrupted by noise during transmission between the plurality of servers;

providing a trust logic stored in each server and operating therein, wherein, the trust logic verifies that the data packets received at a receiving server from a sending sever had originated indeed from the sending server;

providing by the trust logic storage in the memory of the each server, pre-arranged lists of data elements, wherein the data elements are formatted as checksums for use in the data packets;

providing by the trust logic reformatting of each data packet being formatted in the sending server, being communicated to the receiving server, with a checksum that has been randomly selected from the pre-arranged lists;

receiving by the receiving server, the data packets and verifying by the trust logic the checksum in the data packet has a checksum that exists in the pre-arranged lists, thereby the trust logic creates a trust mechanism between the first and the second sever.

14. The method for CND system as in claim 13, comprising the steps of:
replacing the original checksum in the outgoing data packet with the security-checksum obtained from the pre-arranged list of checksums by adding a data pad that computes to the security-checksum;
verifying for the received data packet the packet's security checksum is from the pre-arranged list, for creating a trust that the data packet is from the trusted source.

15. The method as in claim 13, further comprising the steps of:
creating the list of checksums as a subset of all possible checksums and ordering the subset of checksums in a random manner.

16. The method as in claim 13, further comprising the steps of:
maintaining multiple checksum lists by the sending server, each list referenced by identification of the another server;
using by the sending server a specific list corresponding to the another server to which the data packets are sent to, thereby making checksums from a list that is unique to a sending and a receiving server, enabling the receiving server to identify packets as being from a trusted sending server.

17. The method as in claim 16, comprising further steps of:
arranging presence of the checksum list at the sending and receiving servers by one of the methods from a group of, use of Security Association protocol of IP sec protocol, by out of band method, TCP/IP, and by manual method.

18. A method of information security in a security system in a computer network the method comprising steps of:
configuring a plurality of servers, wherein each server has a CPU, a memory, and operating in the CPU and memory of the server an interface logic that exchanges data packets between the plurality of servers, wherein each of the data packet has a data checksum, and wherein the data checksum is used by the interface logic to verify that the data in the data packet has not been corrupted by noise during transmission between the plurality of servers;

providing a trust logic stored in each server and operating therein, wherein, the trust logic verifies that the data packets received at a receiving server from a sending sever had originated indeed from the sending server;

a first method using a checksum-security function that uses a data packet's header checksum for providing security, the checksum-security function randomly selects a security checksum that is randomly selected from a pre-placed list of checksums to replace the original checksum in the checksum field of a data packet headers;

a second method using a checksum-security function that uses a data packet's data checksum for providing security, the checksum-security function randomly selects a security checksum that is randomly selected from a pre-placed list of checksums to replace the original checksum in the checksum field of a data packet data blocks.

19. The method of information security in a security system in a global network as in claim 18, comprising:
 a. using the first method in gateway routers and in other routers of the computer network;
 b. using the second method in sending and receiving hosts.

20. The method of security in a security system in a global network as in claim 18, comprising:
 using the first and the second method for BGP control packets between routers.

\* \* \* \* \*